(12) United States Patent
Han et al.

(10) Patent No.: US 11,784,978 B2
(45) Date of Patent: Oct. 10, 2023

(54) METHOD FOR ESTABLISHING REMOTE WORK ENVIRONMENT TO ENSURE SECURITY OF REMOTE WORK USER TERMINAL AND APPARATUS USING THE SAME

(71) Applicant: ELECTRONICS AND TELECOMMUNICATIONS RESEARCH INSTITUTE, Daejeon (KR)

(72) Inventors: Seung-Hun Han, Daejeon (KR); Ju-Hyung Son, Daejeon (KR); Tae-Ho Nam, Daejeon (KR); Ara Jo, Daejeon (KR); Gak-Soo Lim, Daejeon (KR); Byung-Joon Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 115 days.

(21) Appl. No.: 17/467,812

(22) Filed: Sep. 7, 2021

(65) Prior Publication Data

US 2022/0394015 A1 Dec. 8, 2022

(30) Foreign Application Priority Data

Jun. 7, 2021 (KR) .......................... 10-2021-0073430

(51) Int. Cl.
*H04L 9/40* (2022.01)
*G06F 8/61* (2018.01)
*G06F 9/4401* (2018.01)

(52) U.S. Cl.
CPC ............ *H04L 63/0272* (2013.01); *G06F 8/63* (2013.01); *G06F 9/4416* (2013.01);
(Continued)

(58) Field of Classification Search
None
See application file for complete search history.

(56) References Cited

U.S. PATENT DOCUMENTS 10,992,473 B2  4/2021  Jawahar
2014/0095894 A1* 4/2014 Barton ................ G06F 21/6218
726/1

(Continued)

FOREIGN PATENT DOCUMENTS

KR  10-2011-0038545 A  4/2011
KR  10-2012-0085434 A  8/2012

(Continued)

*Primary Examiner* — Brandon Hoffman
(74) *Attorney, Agent, or Firm* — LRK PATENT LAW FIRM

(57) ABSTRACT

Disclosed herein are a method for establishing a remote work environment for ensuring the security of a user terminal for remote work and an apparatus using the method. The method, performed by the apparatus, includes acquiring media image creation information from a user; creating a certificate for VPN access based on the media image creation information and creating a media image using the media image creation information and the certificate for VPN access; and providing the media image to the user such that the user is able to create a medium for remote work. The user terminal for remote work is booted through the medium for remote work, thereby configuring a runtime environment for remote work in which security is ensured.

18 Claims, 10 Drawing Sheets

(52) U.S. Cl.
CPC ...... *H04L 63/0428* (2013.01); *H04L 63/0823* (2013.01); *H04L 63/108* (2013.01)

(56) References Cited

U.S. PATENT DOCUMENTS

| | | | |
|---|---|---|---|
| 2019/0005576 A1* | 1/2019 | Mick | H04L 41/5054 |
| 2020/0162247 A1* | 5/2020 | Nix | H04L 63/0838 |
| 2020/0267004 A1* | 8/2020 | Lounsberry | H04L 9/3265 |
| 2021/0126801 A1* | 4/2021 | Nix | G06F 8/60 |

FOREIGN PATENT DOCUMENTS

| | | |
|---|---|---|
| KR | 10-2013-0012490 A | 2/2013 |
| KR | 10-1286177 B1 | 7/2013 |
| KR | 10-2019-0036504 A | 4/2019 |

\* cited by examiner

METHOD FOR ESTABLISHING REMOTE WORK ENVIRONMENT TO ENSURE SECURITY OF REMOTE WORK USER TERMINAL AND APPARATUS USING THE SAME

CROSS REFERENCE TO RELATED APPLICATION

This application claims the benefit of Korean Patent Application No. 10-2021-0073430, filed Jun. 7, 2021, which is hereby incorporated by reference in its entirety into this application.

BACKGROUND OF THE INVENTION

1. Technical Field

The present invention relates generally to technology for establishing a remote work environment, and more particularly to technology for ensuring the security of a medium used for running a terminal, the security of a boot sequence of a terminal using the medium, and the security of a runtime environment, in which remote work software is executed after the boot sequence, in order to establish a secure remote work environment.

2. Description of Related Art

"Remote work" means performing work over a network in a space other than a physical workspace in a company or an organization, and in order to smoothly perform remote work, it is essential to establish a secure remote work environment. Because remote work is performed over a network, the security of the network is an important part of remote work. For this reason, existing technology has been focused on network technology such as a Virtual Private Network (VPN) in order to establish a secure remote work environment. VPN technology for establishing a virtual private network over a public network is configured to encrypt user data and important business data at the network level before transmission and reception thereof, thereby preventing important information from being leaked over a network.

Although a network is an important part of a remote work environment, the security of the network cannot be trusted unless the security of a terminal used for remote work is ensured. In order to improve the security of a terminal, companies and organizations recommend that remote work be performed using a private terminal, rather than a public terminal. However, this cannot be guaranteed because a terminal and a workplace are selected by each individual, and there is a problem in which a private terminal is also not free from the threat of malware. If information related to work is temporarily stored in a terminal, the problem of leakage of important information may occur when the terminal is lost or taken away.

In order to improve the security of a terminal used for a remote work environment, a specialized Operating System (OS) in the form of a Live CD, which records an open OS in a CD or DVD medium and uses the same, has been developed in the U.S. This OS, referred to as Trusted End-Node Security (TENS), is booted with a medium and run, without requiring the process of installing the OS in a terminal. TENS does not use an existing OS installed in a terminal, and is configured to record an OS in a read-only medium in which it is difficult to tamper with data. Accordingly, it has an advantage in that a terminal can be securely protected from the threat of malware.

However, because information is recorded in the form of plaintext, data stored in the medium is not encrypted. Accordingly, when the medium is lost or taken away, information stored therein may be leaked. Due to this risk, a Live CD includes only publicly available software, which imposes limitations as to functionality and security.

DOCUMENTS OF RELATED ART (Patent Document 1) Korean Patent No. 10-1286177, registered on Jul. 9, 2013 and titled "Security system and method for mobile office".

SUMMARY OF THE INVENTION

An object of the present invention is to ensure the security of a terminal for remote work in order to respond to a security threat in a remote work environment and to provide an apparatus therefor, thereby establishing a secure remote work environment.

Another object of the present invention is to encrypt important information in a medium that is used for running a terminal for remote work, thereby allowing access only by an authorized user.

A further object of the present invention is to boot a terminal after checking whether a user is an authorized user in a boot sequence and to prevent the user from accessing the existing storage medium of the terminal after the terminal is booted.

Yet another object of the present invention is to impose limitations such that a terminal is allowed to access only a securely configured network, thereby protecting the terminal from malware.

Still another object of the present invention is to delete, when remote work is finished, all temporary files generated during the remote work, thereby preventing information leakage.

Still another object of the present invention is to securely protect a medium for remote work and to ensure the security of a boot sequence and runtime environment of a terminal, thereby enabling a user to establish a secure work environment in the terminal and to perform remote work.

In order to accomplish the above objects, a method for establishing a remote work environment, performed by an apparatus for establishing a remote work environment for ensuring the security of a user terminal for remote work, according to the present invention includes acquiring media image creation information from a user; creating a certificate for Virtual Private Network (VPN) access based on the media image creation information; creating a media image using the media image creation information and the certificate for VPN access; and providing the media image to the user such that the user is able to create a medium for remote work. The user terminal for remote work may be booted through the medium for remote work, which is created so as to correspond to the media image, thereby configuring a runtime environment for remote work, in which security is ensured.

Here, the media image creation information may include user information, a media image validity period, and media image encryption information.

Here, the media image may be a disk image file encrypted using the media image encryption information.

Here, the media image may be configured with operating system (OS) core component files and OS filesystem files.

Here, the OS core component files may include a boot loader, a kernel, a kernel module, and a RAM disk for initial booting, and the OS filesystem files may include service and security software, a VPN certificate, VPN software, business software, and settings information related to various functions and security.

Here, the medium for remote work may be in a form in which the encrypted disk image file, corresponding to the media image, is stored in a storage medium readable by the user terminal for remote work.

Here, creating the media image may include creating a plaintext media image in which Operating System (OS) software, security software, VPN software, and business software are included; and creating an encrypted media image by encrypting the plaintext media image using the media image encryption information.

Here, creating the plaintext media image may include creating a package binary by building source code stored in an OS and security package repository and source code stored in a VPN and business package repository, and the plaintext media image may be created by combining the created package binary with package binaries stored in the respective package repositories.

Here, creating the encrypted media image may be configured to perform encryption using an encryption key or a password included in the media image encryption information and to include an OS boot loader for decryption in the encrypted media image such that decryption is capable of being performed in the user terminal for remote work.

Here, the user terminal for remote work may decrypt the encrypted media image and verify integrity thereof using media image decryption information acquired from the user based on execution of the OS boot loader for decryption.

Here, the user terminal for remote work may configure the runtime environment for remote work, in which the security is ensured, by executing the OS software and the security software, may access a VPN by executing the VPN software, and may access a work system by executing the business software.

Here, the certificate for VPN access may be created based on the user information and the media image validity period.

Here, the method may further include, when a request to create a new media image is made by the user in a state in which the media image is created, discarding the media image and the certificate for VPN access.

Also, an apparatus for establishing a remote work environment for ensuring the security of a user terminal for remote work according to an embodiment includes a processor for acquiring media image creation information from a user, creating a certificate for Virtual Private Network (VPN) access based on the media image creation information, creating a media image using the media image creation information and the certificate for VPN access, and providing the media image to the user such that the user is able to create a medium for remote work; and memory for storing the media image creation information and the media image. The user terminal for remote work may be booted through the medium for remote work, which is created so as to correspond to the media image, thereby configuring a runtime environment for remote work in which security is ensured.

Here, the media image creation information may include user information, a media image validity period, and media image encryption information.

Here, the media image may be a disk image file encrypted using the media image encryption information.

Here, the media image may be configured with operating system (OS) core component files and OS filesystem files.

Here, the OS core component files may include a boot loader, a kernel, a kernel module, and a RAM disk for initial booting, and the OS filesystem files may include service and security software, a VPN certificate, VPN software, business software, and settings information related to various functions and security.

Here, the medium for remote work may be in a form in which the encrypted disk image file, corresponding to the media image, is stored in a storage medium readable by the user terminal for remote work.

Here, the processor may create a plaintext media image in which Operating System (OS) software, security software, VPN software, and business software are included, and may create an encrypted media image by encrypting the plaintext media image using the media image encryption information.

Here, the processor may create a package binary by building source code stored in an OS and security package repository and source code stored in a VPN and business package repository, and may create the plaintext media image by combining the created package binary with package binaries stored in the respective package repositories.

Here, the processor may perform encryption using an encryption key or a password included in the media image encryption information, and may include an OS boot loader for decryption in the encrypted media image such that decryption is capable of being performed in the user terminal for remote work.

Here, the user terminal for remote work may decrypt the encrypted media image and verify integrity thereof using media image decryption information acquired from the user based on execution of the OS boot loader for decryption.

Here, the user terminal for remote work may configure the runtime environment for remote work, in which the security is ensured, by executing the OS software and the security software, may access a VPN by executing the VPN software, and may access a work system by executing the business software.

Here, the certificate for VPN access may be created based on the user information and the media image validity period.

Here, when a request to create a new media image is made by the user in a state in which the media image is created, the processor may discard the media image and the certificate for VPN access.

BRIEF DESCRIPTION OF THE DRAWINGS

The above and other objects, features, and advantages of the present invention will be more clearly understood from the following detailed description taken in conjunction with the accompanying drawings, in which.

DESCRIPTION OF THE PREFERRED EMBODIMENTS

Figure 1:
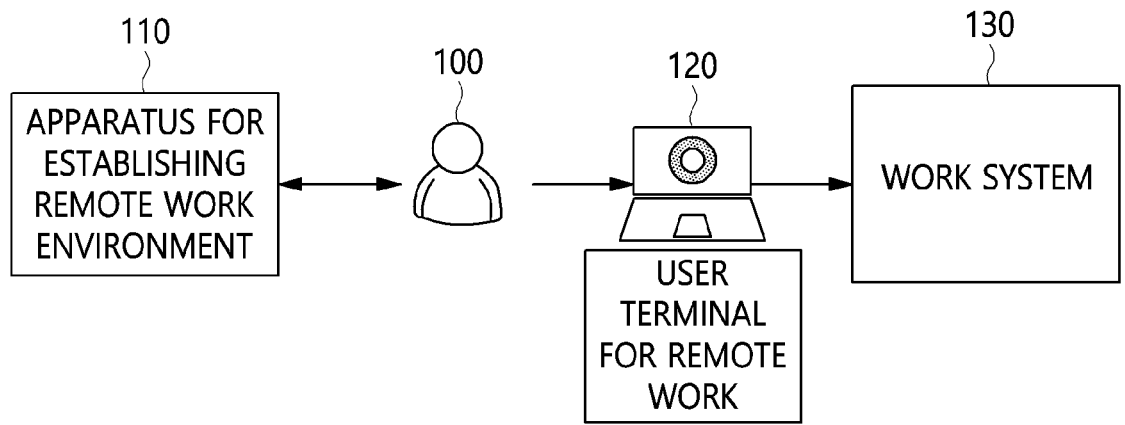
FIG. 1 is a view illustrating a system for establishing a remote work environment for ensuring the security of a user terminal for remote work according to an embodiment of the present invention.

The present invention will be described in detail below with reference to the accompanying drawings. Repeated descriptions and descriptions of known functions and configurations which have been deemed to unnecessarily obscure the gist of the present invention will be omitted below. The embodiments of the present invention are intended to fully describe the present invention to a person having ordinary knowledge in the art to which the present invention pertains. Accordingly, the shapes, sizes, etc. of components in the drawings may be exaggerated in order to make the description clearer.

Hereinafter, a preferred embodiment of the present invention will be described in detail with reference to the accompanying drawings.

FIG. 1 is a view illustrating a system for establishing a remote work environment for ensuring the security of a user terminal for remote work according to an embodiment of the present invention.

Referring to FIG. 1, the system for establishing a remote work environment for ensuring the security of a user terminal for remote work according to an embodiment of the present invention may include a user 100, a remote work environment establishment apparatus 110, a user terminal for remote work 120, and a work system 130.

The user 100 provides media image creation information to the remote work environment establishment apparatus 110 when it is necessary to perform remote work.

Here, the media image creation information may include user information, a media image validity period, and media image encryption information.

The remote work environment establishment apparatus 110 acquires the media image creation information from the user 100.

Also, the remote work environment establishment apparatus 110 creates a certificate for VPN access based on the media image creation information, and creates a media image using the media image creation information and the certificate for VPN access.

Here, the certificate for VPN access may be created based on the user information and the media image validity period.

Here, the media image may be a disk image file encrypted using the media image encryption information.

Here, the media image may be configured with OS core component files and OS filesystem files.

Here, the OS core component files may include a boot loader, a kernel, a kernel module, and a RAM disk for initial booting, and the OS filesystem files may include service and security software, a VPN certificate, VPN software, business software, and settings information related to various functions and security.

Here, a plaintext media image including OS software, security software, VPN software, and business software may be created.

Here, source code stored in an OS and security package repository and source code stored in a VPN and business package repository are separately built, whereby a package binary may be created.

Here, a plaintext media image may be created by combining the created package binary with package binaries stored in the respective package repositories.

Here, the plaintext media image is encrypted using the media image encryption information, whereby an encrypted media image may be created.

Here, encryption is performed using an encryption key or a password included in the media image encryption information, in which case an OS boot loader for decryption may be included in the encrypted media image such that decryption can be performed in the user terminal for remote work.

Also, the remote work environment establishment apparatus 110 provides the media image to the user 100 such that the user 100 is able to create a medium for remote work.

Here, the medium for remote work may be in a form in which an encrypted disk image file corresponding to the media image is stored in a storage medium readable by the user terminal for remote work 120.

Also, when a request to create a new media image is made by the user 100 in the state in which a media image has been created, the remote work environment establishment apparatus 110 discards the media image and the certificate for VPN access.

The user terminal for remote work 120 is booted through the medium for remote work, which is created so as to correspond to the media image, thereby configuring a runtime environment for remote work, in which security is ensured.

Here, the user terminal for remote work 120 may decrypt the encrypted media image and verify the integrity thereof using media image decryption information acquired from the user based on execution of an OS boot loader for decryption.

Here, the user terminal for remote work 120 may configure a runtime environment for remote work in which security is ensured by executing the OS software and the security software, may access a virtual private network by executing the VPN software, and may access the work system 130 by executing the business software.

Figure 2:
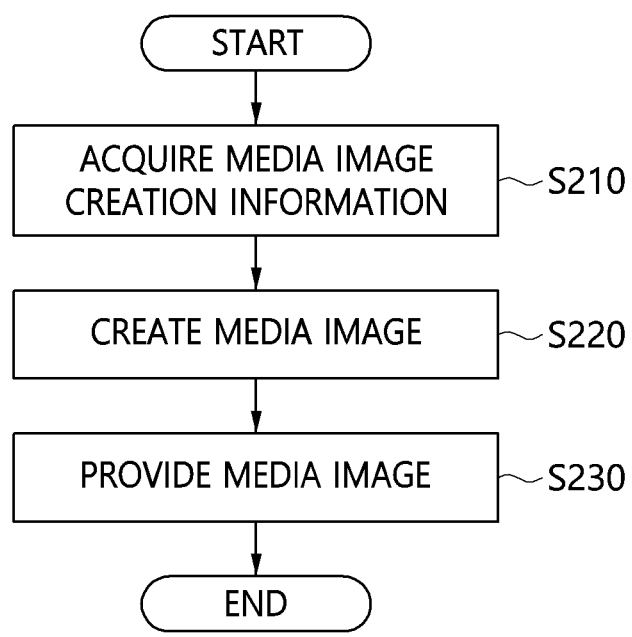
FIG. 2 is a flowchart illustrating a method for establishing a remote work environment for ensuring the security of a user terminal for remote work according to an embodiment of the present invention.

FIG. 2 is a flowchart illustrating a method for establishing a remote work environment for ensuring the security of a user terminal for remote work according to an embodiment of the present invention.

Referring to FIG. 2, in the method for establishing a remote work environment for ensuring the security of a user terminal for remote work according to an embodiment of the present invention, an apparatus for establishing a remote work environment for ensuring the security of a user terminal for remote work acquires media image creation information from a user at step S210.

Figure 3:
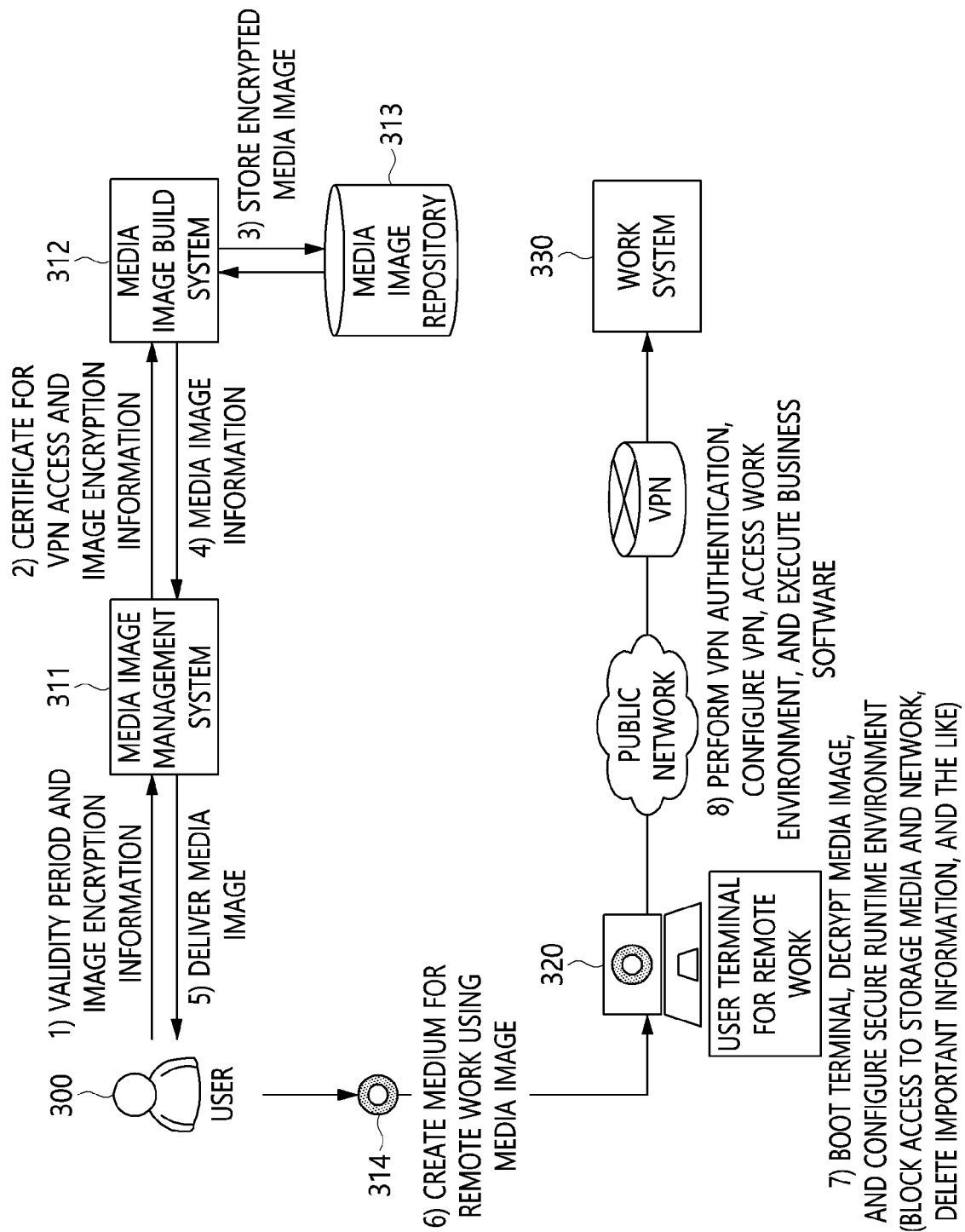
FIG. 3 is a view illustrating in detail an example of the process of establishing a remote work environment according to the present invention.

For example, referring to FIG. 3, when it is necessary to perform remote work, a user 300 provides media image creation information to a media image management system 311, which configures the apparatus for establishing a remote work environment, thereby requesting a media image.

Here, the media image management system 311, the media image build system 312, and the media image repository 313 illustrated in FIG. 3 may be components of the apparatus for establishing a remote work environment according to an embodiment of the present invention.

Here, the media image creation information may include user information, a media image validity period, and media image encryption information.

For example, the media image encryption information may include a password, a disk encryption key, and the like.

Here, the media image management system 311 illustrated in FIG. 3 may serve to issue a media image for remote work.

Figure 4:
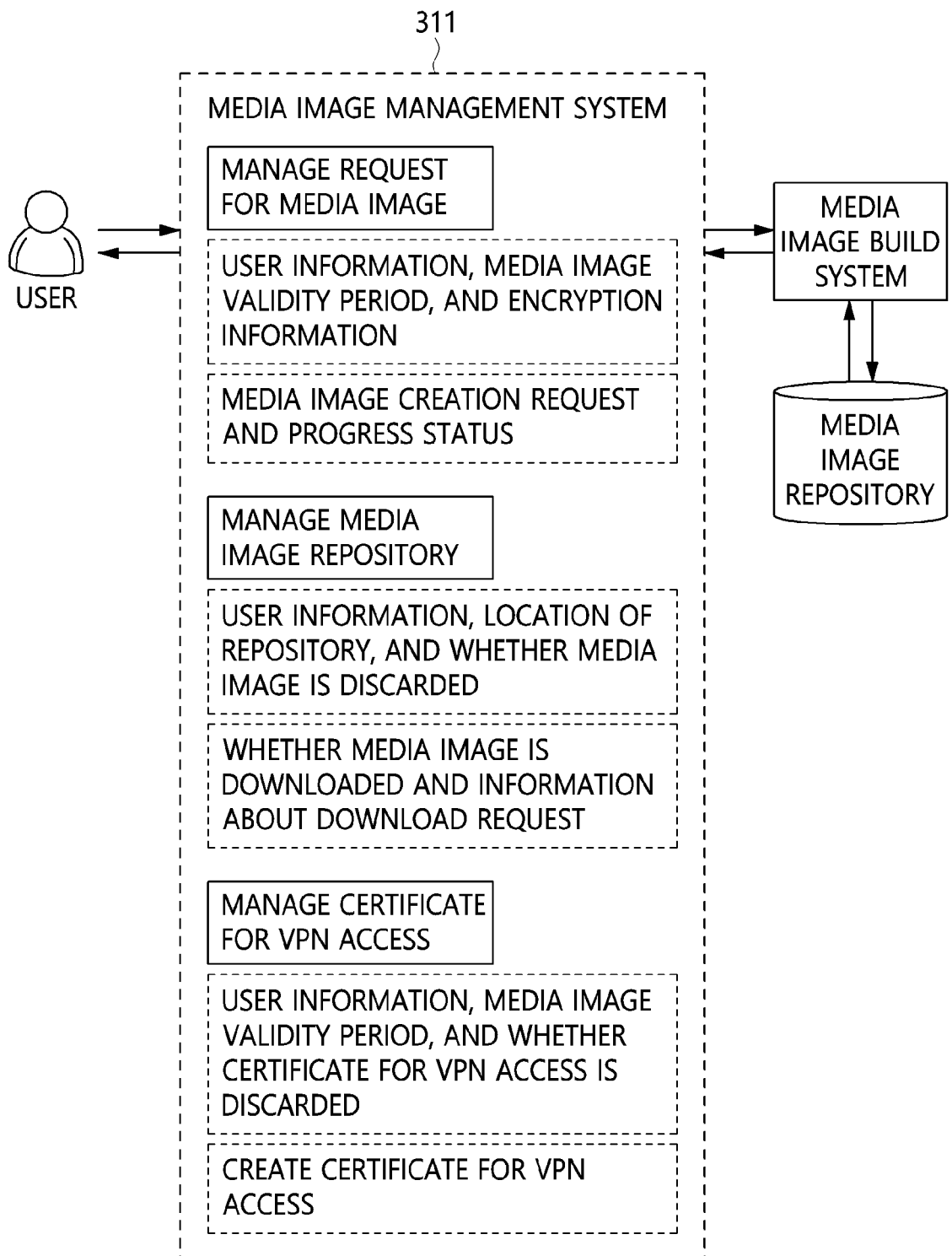
FIG. 4 is a view illustrating an example of the media image management system illustrated in FIG. 3.

Describing this in detail with reference to FIG. 4, the media image management system 311 may operate to perform a media image request management function, a media image repository management function, and a VPN access certificate management function.

The media image management system 311 may manage information about the user who requests a media image, a media image validity period, and media image encryption information through the media image request management function. Also, the media image management system 311 may deliver a request to create a media image to the media image build system, and may manage progress status, such as information about whether the media image build system has completed a build operation or whether an error occurs.

Also, through the media image repository management function, the media image management system 311 may manage information about the user who requests a media image, the location of the media image in the repository, and information about whether the media image is discarded, and may manage information about whether the user downloads the media image and information about a download request (user information, an IP address, and the like).

Also, through the VPN access certificate management function, the media image management system 311 may manage user information, a media image validity period, and information about whether a certificate for VPN access is discarded, and may create a certificate for VPN access based on the user information and the media image validity period and deliver the same to the media image build system.

Also, in the method for establishing a remote work environment for ensuring the security of a user terminal for remote work according to an embodiment of the present invention, the apparatus for establishing a remote work environment for ensuring the security of a user terminal for remote work creates a certificate for VPN access based on the media image creation information and creates a media image using the media image creation information and the certificate for VPN access at step S220.

For example, referring to FIG. 3, the media image management system 311 may record information about the request of the user using the media image creation information received from the user 300, and may create a certificate for VPN access based thereon.

Here, the certificate for VPN access may be created based on the user information and the media image validity period.

After the certificate for VPN access is created, the certificate for VPN access and the media image encryption information acquired from the user are delivered to the media image build system 312, whereby creation of a media image may be requested.

Here, the media image build system 312 illustrated in FIG. 3 may serve to create a media image using the certificate for VPN access and the media image encryption information.

For example, after it configures an OS for remote work, the media image build system 312 may encrypt OS core components and a filesystem using the certificate for VPN access and the media image encryption information, which are received from the media image management system 311. Then, the media image build system 312 may store the encrypted media image in the media image repository 313, and may also deliver the encrypted media image to the media image management system 311.

That is, the media image may be a disk image file encrypted using the media image encryption information.

Here, the media image may be configured with OS core component files and OS filesystem files.

Here, the OS core component files may include a boot loader, a kernel, a kernel module, and a RAM disk for initial booting.

Here, the OS filesystem files may include service security software, a VPN certificate, VPN software, business software, and settings information related to various functions and security.

Here, a plaintext media image, in which OS software, security software, VPN software, and business software are included, may be created.

Here, a package binary may be created by building source code stored in an OS and security package repository and source code stored in a VPN and business package repository.

Here, a plaintext media image may be created by combining the created package binary with package binaries stored in the respective package repositories.

Here, the plaintext media image is encrypted using the media image encryption information, whereby an encrypted media image may be created.

Here, encryption is performed using an encryption key or a password included in the media image encryption information, in which case an OS boot loader for decryption may be included in the encrypted media image such that decryption can be performed in the user terminal for remote work.

Figure 5:
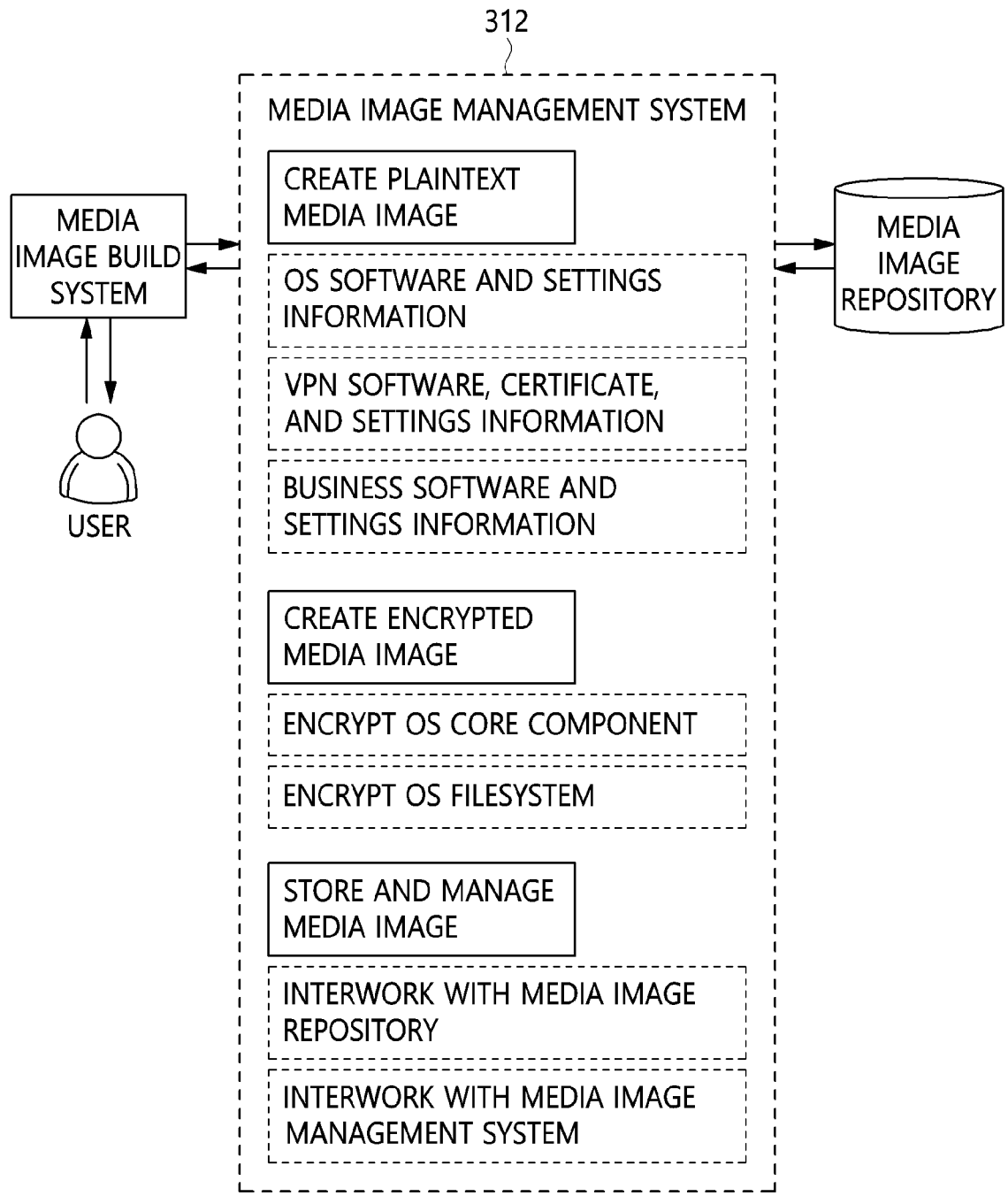
FIG. 5 is a view illustrating an example of the media image build system illustrated in FIG. 3.

Describing this in detail with reference to FIG. 5, the media image build system 312 may operate to perform a plaintext media image creation function, an encrypted media image creation function, and a media image storage and management function.

The media image build system 312 may configure OS software and create settings information related to functions and security through the plaintext media image creation function. Also, the media image build system 312 may install VPN software, a VPN certificate, and business software in order to establish a secure remote work environment, and may create settings information related to various functions and security.

Also, the media image build system 312 may encrypt the OS core component files (a boot loader, a kernel, a kernel module, and a RAM disk for initial booting) and the OS filesystem files of the plaintext media image using the media image encryption information received from the media image management system.

Also, the media image build system 312 may store the created media image in the media image repository 313 through the media image storage and management function, and may deliver information about the created media image to the media image management system 311.

Hereinafter, a process in which the media image build system creates a plaintext media image will be described in detail with reference to FIG. 6.

Figure 6:
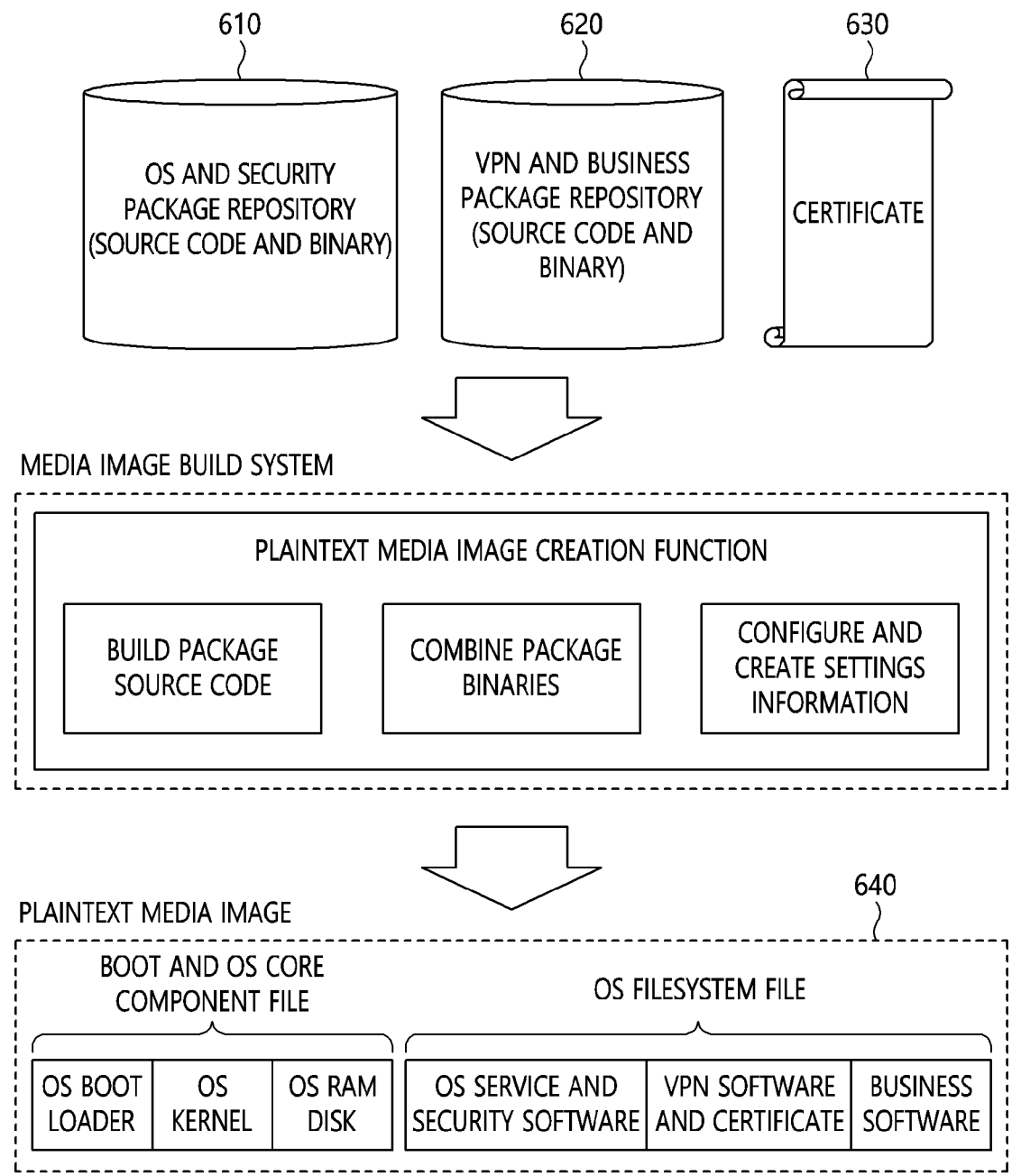
FIG. 6 is a view illustrating an example of the process of creating a plaintext media image according to the present invention.

Referring to FIG. 6, the plaintext media image creation function of the media image build system may include subfunctions, such as a package source code build function, a package binary combination function, and a settings information creation and configuration function.

First, the media image build system builds source code stored in an OS and security package repository 610 and source code stored in a VPN and business package repository 620 through the package source code build function, thereby creating a package binary.

Subsequently, the media image build system combines the package binary, created through the package source code build function, with package binaries stored in the respective package repositories 610 and 620 through the package binary combination function, thereby creating a plaintext media image.

Subsequently, through the settings information creation and configuration function, the media image build system may configure settings information related to an OS, VPN software, and business software and create security-related settings information for a certificate for VPN access, restriction of access to storage media, restriction of access to unauthorized networks, and the like.

Here, the security-related settings information may be used to enable software security functions, such as blocking access to storage media, blocking access to an unauthorized network, and the like. The enabled security function may serve to ensure the security of a runtime environment for remote work.

Subsequently, the media image build system may create a plaintext media image 640 as the final output of the plaintext media image creation function. The created plaintext media image 640 may be configured with boot and OS core component files and OS filesystem files, as illustrated in FIG. 6.

For example, the boot and OS core component files may include an OS boot loader for a boot sequence, an OS kernel and a kernel module for OS core functions, and an OS RAM disk for initial booting. Also, the OS filesystem files may include OS service and security software, a VPN certificate, VPN software, business software, and settings information related to various functions and security.

Hereinafter, a process in which the media image build system creates an encrypted media image will be described in detail with reference to FIG. 7.

Figure 7:
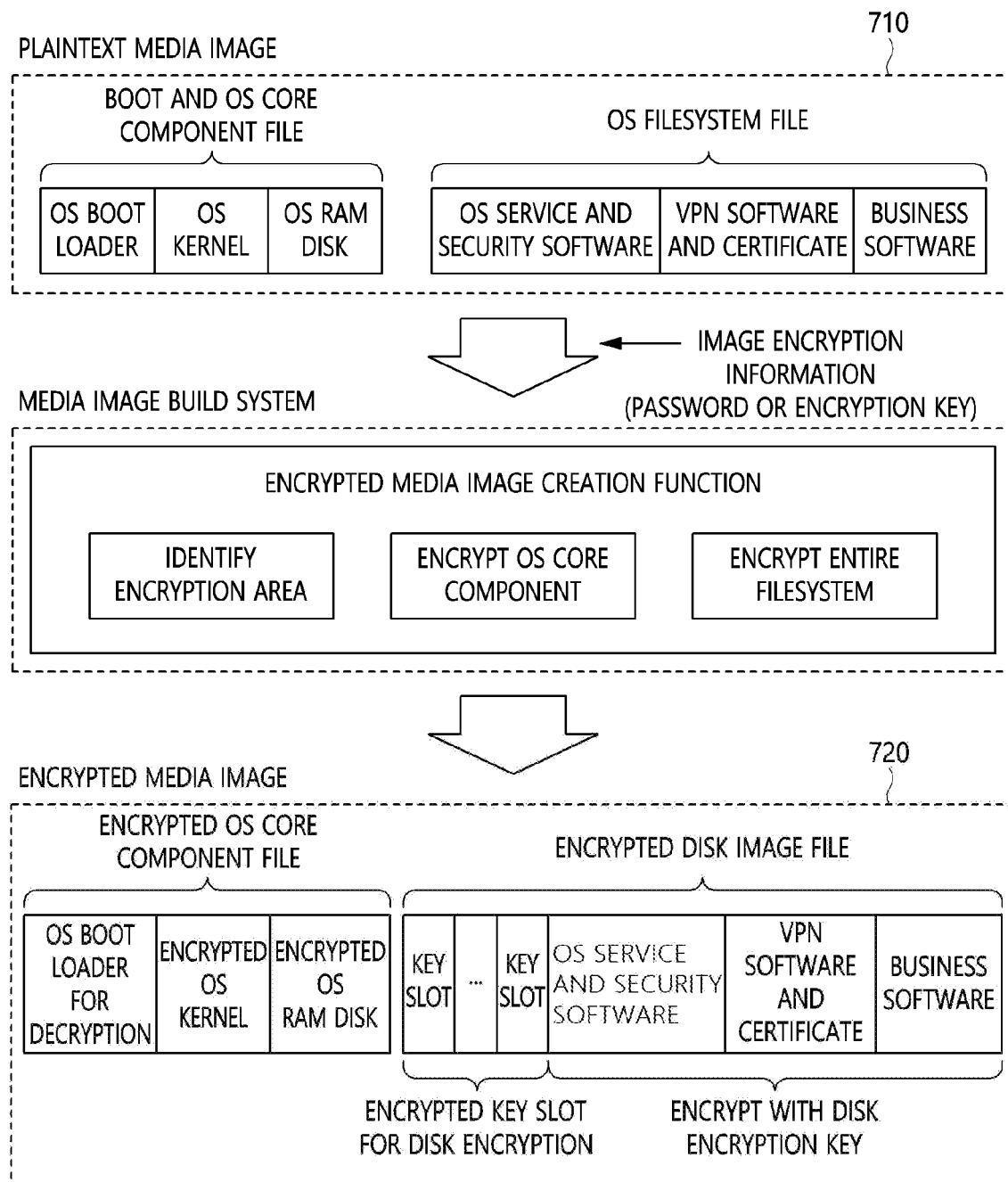
FIG. 7 is a view illustrating an example of the process of creating an encrypted media image according to the present invention.

Referring to FIG. 7, the encrypted media image creation function of the media image build system may include subfunctions, such as an encryption area identification function, an OS core component encryption function, and an entire filesystem encryption function.

First, the media image build system may identify boot and OS core component files and OS filesystem files for which encryption is required in the plaintext media image 710 through the encryption area identification function.

Subsequently, the media image build system may encrypt the OS kernel, the kernel module, and the OS RAM disk through the OS core component encryption function.

Here, encryption may be performed using the media image encryption information (a password or an encryption key) received from the media image management system. For example, when an encryption key is included in the media image encryption information, encryption may be performed by directly inputting the encryption key to an encryption algorithm. Alternatively, when not an encryption key but a password is included in the media image encryption information, encryption may be performed based on an encryption algorithm after an encryption key is derived from the password.

Here, in order to enable the encrypted OS core component files to be decrypted in the user terminal for remote work, a function related thereto (an OS boot loader for decryption) may be added in the OS boot loader.

Subsequently, the media image build system may create an encrypted disk image file through the entire filesystem encryption function.

Here, a plaintext disk image file is created first, and the plaintext disk image file is encrypted using the media image encryption information, whereby an encrypted disk image file may be created.

Here, when an encryption key is included in the media image encryption information, encryption may be directly performed using the encryption key, but when not an encryption key but a password is included in the media image encryption information, encryption may be performed using either of the following two methods.

For example, an encryption key is derived from the password, and the plaintext disk image file may be encrypted using the encryption key.

In another example, after a key slot is assigned to the plaintext disk image, an arbitrary encryption key, generated using a random number, may be stored in the assigned key slot and may then be encrypted using the password.

The two exemplary methods described above may be selected or combined according to the purpose, and FIG. 7 shows an example of the disk image file encrypted using the method of assigning a key slot.

Through this process, the plaintext media image 710 is changed and encrypted, whereby an encrypted media image 720, in which the OS boot loader for decryption, the encrypted OS core component file, and the encrypted disk image file are included, may be finally created.

Also, in the method for establishing a remote work environment for ensuring the security of a user terminal for remote work according to an embodiment of the present invention, the apparatus for establishing a remote work environment for ensuring the security of a user terminal for remote work provides the media image to the user at step S230 such that the user is able to create a medium for remote work.

For example, referring to FIG. 3, the media image management system 311 stores the media image information, received from the media image build system 312, and information about whether creation of the media image is completed therein, and provides the user 300 with information for accessing the media image using email, a text message, or the like, thereby delivering the media image.

Here, the medium for remote work may be in a form in which the encrypted disk image file corresponding to the media image is stored in a storage medium readable by the user terminal for remote work.

For example, the user 300 stores the media image in a medium, such as a CD, a DVD, a USB disk, or the like, using the information received from the media image management system 311, thereby creating a medium for remote work.

Here, the user terminal for remote work is booted through the medium for remote work, which is created so as to correspond to the media image, thereby configuring a runtime environment for remote work in which security is ensured.

For example, referring to FIG. 3, the user 300 may boot the user terminal for remote work 320 using the medium for remote work 314.

Here, the user terminal for remote work may decrypt the encrypted media image and verify the integrity thereof using media image decryption information, which is acquired from the user based on execution of the OS boot loader for decryption.

For example, referring to FIG. 3, the user terminal for remote work 320, which is booted using the medium for remote work 314, may request the media image decryption information from the user 300, and may decrypt the encrypted OS core components and the encrypted OS filesystem. Here, if the OS core components and the OS filesystem included in the medium for remote work 314 are tampered with, decryption using the media image decryption information provided by the user 300 will fail, and in this way, integrity may be guaranteed.

As described above, the user terminal for remote work 320 may be booted using the OS core components and the OS filesystem, the integrity of which is guaranteed, and may configure a secure runtime environment while booting.

Here, the user terminal for remote work may configure a runtime environment for remote work in which security is ensured by executing the OS software and the security software.

For example, referring to FIG. 3, the user terminal for remote work 320 prevents the user 300 and software from accessing an existing storage device connected to the user terminal for remote work 320 and from accessing an unauthorized network, thereby preventing a malware security threat. Also, when it is necessary to store information during operation of the user terminal for remote work 320, the information is stored in main memory (RAM), and when the user terminal for remote work 320 is terminated, the information stored in the main memory (RAM) is deleted, whereby leakage of temporary information and important information, which can occur when the information is retained in the user terminal for remote work 320, may be prevented.

Here, access to a VPN may be made by executing the VPN software, and access to a work system may be made by executing the business software.

For example, referring to FIG. 3, the user 300 may perform VPN authentication and establish a VPN through the booted user terminal for remote work 320 based on a secure runtime environment. Business software may be executed via the established VPN, and remote access to the work system 330 may be made.

Hereinafter, the process of establishing a remote work environment using a medium for remote work and a user terminal for remote work and performing remote work will be described in detail with reference to FIG. 8.

Figure 8:
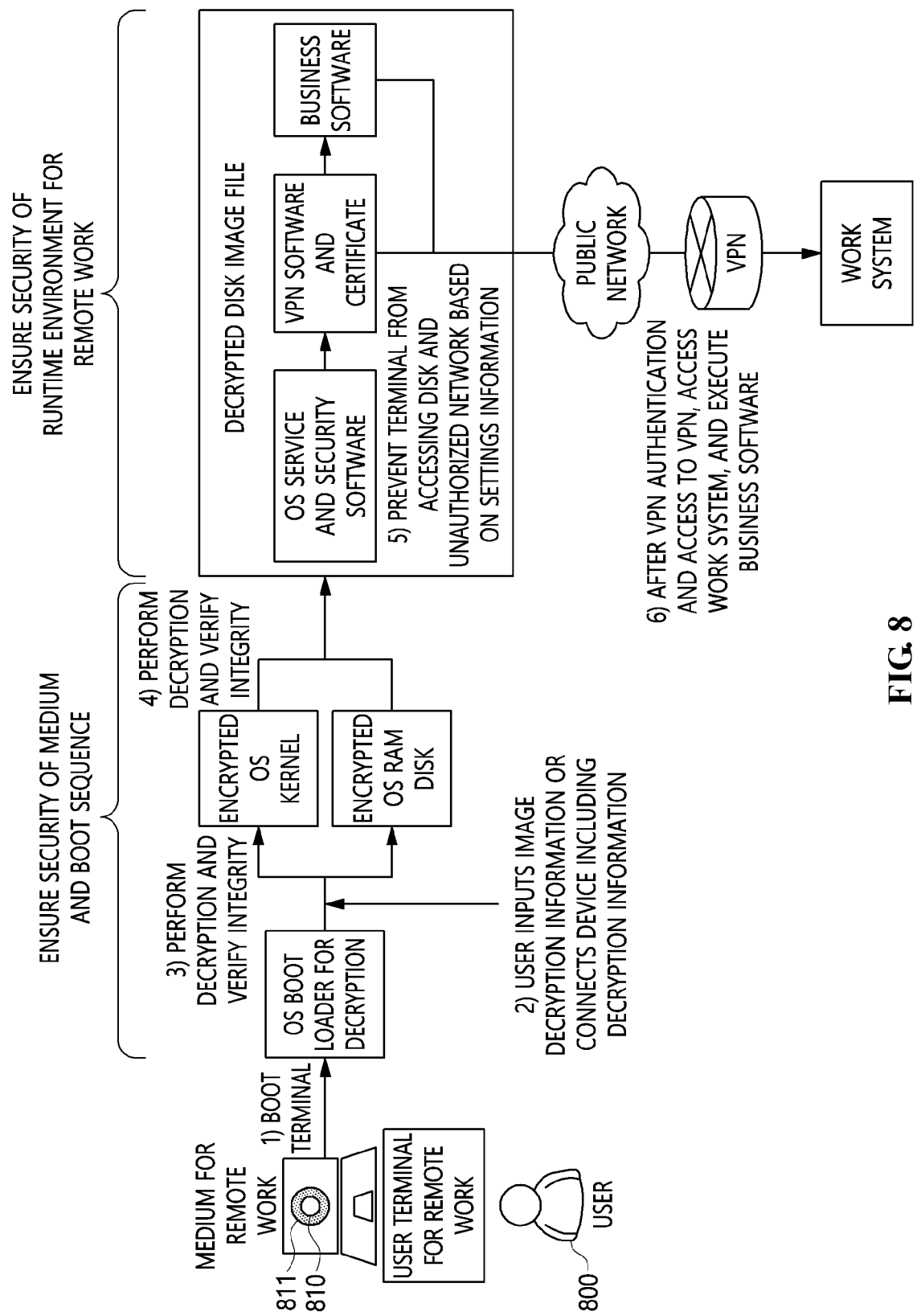
FIG. 8 is a view illustrating an example of establishment of a remote work environment and workflow according to the present invention.

Referring to FIG. 8, a user 800 may create a medium for remote work 811 in advance by storing a media image in a storage medium, such as a CD, a DVD, a USB disk, or the like. Subsequently, the user 800 may boot a user terminal for remote work 810 by connecting the medium for remote work 811 thereto.

Subsequently, the booted user terminal for remote work 810 may execute an OS boot loader for decryption, which is stored in the medium for remote work 811, and the OS boot loader for decryption may request media image decryption information from the user 800.

Subsequently, the user 800 may provide the media image decryption information by directly inputting the same to the user terminal for remote work 810 or by connecting a device in which relevant information is stored, such as a Micro SD device, an encryption key storage device, a USB storage device, or the like. Here, in order to authenticate the device to be connected, additional information may be provided.

Subsequently, the OS boot loader for decryption may decrypt an encrypted OS kernel and an encrypted OS RAM disk and simultaneously verify the integrity thereof using the input media image decryption information.

After decryption and integrity verification are completed, the OS boot loader for decryption may execute the decrypted OS kernel and the decrypted OS RAM disk.

Here, the decrypted OS kernel and the decrypted OS RAM disk may decrypt an encrypted disk image file based on the previously acquired media image decryption information, and may simultaneously verify the integrity thereof.

Here, when additional information or authentication is required, relevant information may be requested from the user 800 again, or connection of a device in which relevant information is stored may be requested.

Subsequently, when the disk image file is decrypted, the disk image is connected to the user terminal for remote work 810, and the OS service and security software stored therein may be executed.

Here, the OS service and the security software may serve to configure a secure runtime environment in which remote work software is to be run. To this end, a security function is enabled through the process of recognizing security-related settings information, whereby the user 800 and software may be prevented from accessing a storage medium or disk connected to the user terminal for remote work 810 and from accessing an unauthorized network.

That is, because access to the storage medium or disk connected to the user terminal for remote work 810 is blocked, content that is created or changed after the security function is enabled may be stored in the main memory (RAM) of the user terminal for remote work 810. Also, the content stored in the main memory is completely deleted when the user terminal for remote work 810 is terminated, whereby leakage of important information may be prevented.

After the OS service and the security software are executed, VPN software may be executed, and VPN authentication may be performed using a certificate for VPN access.

Subsequently, when a VPN is configured, business software may be executed, and the user 800 accesses a work system using the business software or by executing additional software, thereby performing remote work in a secure environment.

Also, although not illustrated in FIG. 2, in the method for establishing a remote work environment for ensuring the security of a user terminal for remote work according to an embodiment of the present invention, when creation of a new media image is requested by a user in the state in which a media image has been created, the apparatus for establishing a remote work environment for ensuring the security of a user terminal for remote work may discard the media image and the certificate for VPN access.

That is, a media image may be created when a user requests the same according to need, and when a new media image is created, a previously created media image and a certificate for VPN access for the previously created media image may be discarded by the media image management system 311 illustrated in FIG. 4.

In this case, because remote access to a work environment using the previously created media image is impossible, the user may be issued with a media image that is newly created in response to the request by the user, and may access the remote work environment using the same.

The above-described method for establishing a remote work environment ensures the security of a terminal for remote work in order to respond to a security threat in a remote work environment, and provides an apparatus for the same, whereby a secure remote work environment may be established.

Also, encryption of a medium used for running a terminal for remote work, user authentication and the boot sequence of the terminal using the encrypted medium, and a method for ensuring the security of a runtime environment in which remote work software is run after the boot sequence may be provided.

Also, a medium for remote work is securely protected, and the security of a boot sequence and runtime environment of a terminal is ensured, whereby a user may be enabled to establish a secure work environment in the terminal and to perform remote work.

Also, leakage of important information, which can occur when a medium is lost or taken away, may be prevented.

Figure 9:
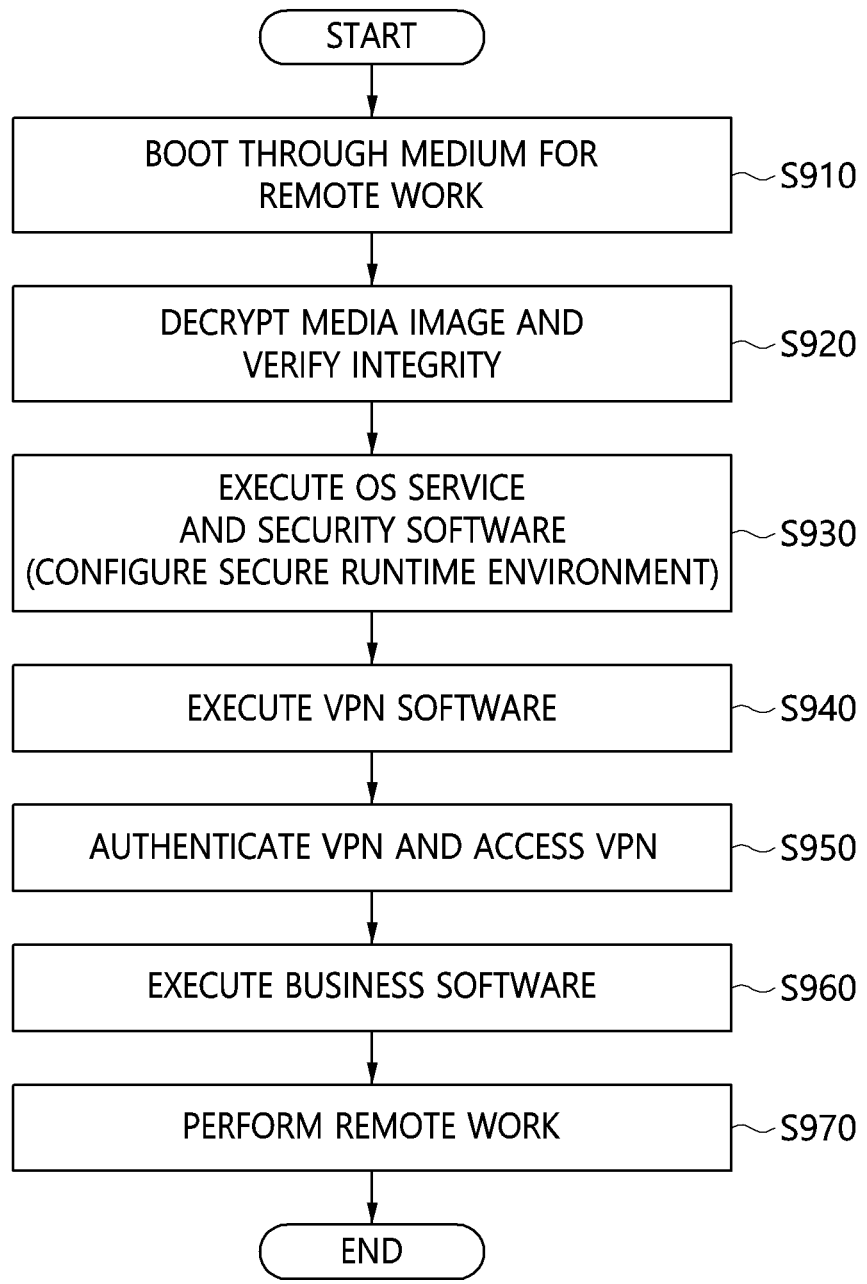
FIG. 9 is a flowchart illustrating in detail a process in which a user terminal is booted and remote work is performed in a method for establishing a remote work environment according to an embodiment of the present invention.

FIG. 9 is a flowchart illustrating in detail a process in which a user terminal is booted and remote work is performed in a method for establishing a remote work environment according to an embodiment of the present invention.

Referring to FIG. 9, in the process in which a user terminal is booted and remote work is performed in the method for establishing a remote work environment according to an embodiment of the present invention, first, a user may boot a user terminal for remote work at step S910 by connecting a medium for remote work to the user terminal for remote work.

Subsequently, the booted user terminal for remote work executes an OS boot loader for decryption, which is stored in the medium for remote work, thereby decrypting a media image and verifying the integrity thereof at step S920.

Here, the OS boot loader for decryption may request media image decryption information from the user, and may decrypt an encrypted OS kernel and an encrypted OS RAM disk using the media image decryption information provided by the user.

Here, the decrypted OS kernel and the decrypted OS RAM disk may decrypt an encrypted disk image file based on the previously acquired media image decryption information, and may simultaneously verify the integrity thereof.

Subsequently, when the disk image file is decrypted, the disk image is connected to the user terminal for remote work, and OS service and security software stored therein may be executed at step S930.

After the OS service and the security software are executed, VPN software may be executed at step S940, and VPN authentication and access to a VPN may be performed using a certificate for VPN access at step S950.

Subsequently, when the VPN is configured, business software may be executed at step S960, and the user may access a work system by executing the business software or additional software, thereby performing remote work in a secure environment at step S970.

Figure 10:
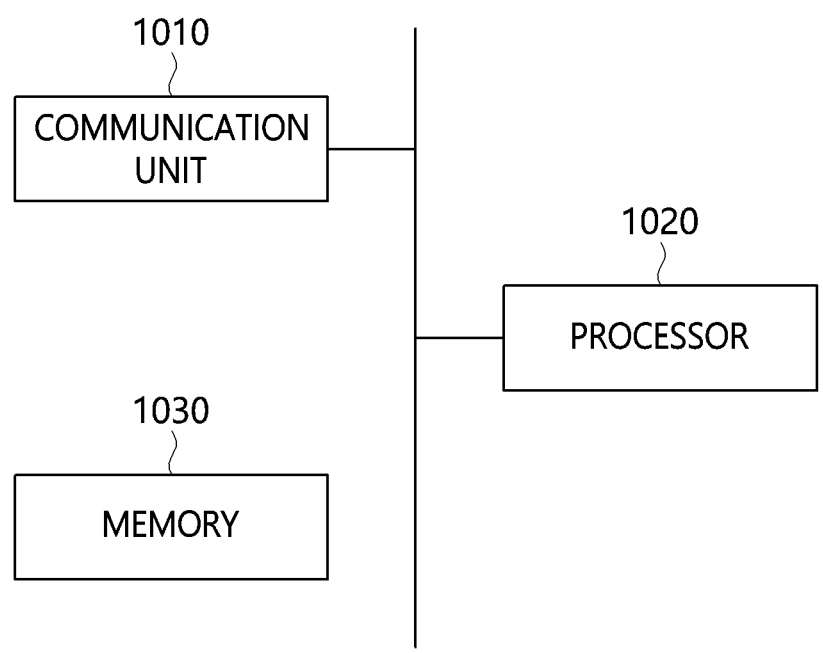
FIG. 10 is a block diagram illustrating an apparatus for establishing a remote work environment for ensuring the security of a user terminal for remote work according to an embodiment of the present invention.

FIG. 10 is a block diagram illustrating an apparatus for establishing a remote work environment for ensuring the security of a user terminal for remote work according to an embodiment of the present invention.

Referring to FIG. 10, the apparatus for establishing a remote work environment for ensuring the security of a user terminal for remote work according to an embodiment of the present invention includes a communication unit 1010, a processor 1020, and memory 1030.

The communication unit 1010 may serve to transmit and receive information required for establishing a remote work environment through a communication network. Here, the network provides a path via which data is delivered between devices, and may be conceptually understood to encompass networks that are currently being used and networks that have yet to be developed.

For example, the network may be an IP network, which provides service for transmission and reception of a large amount of data and a seamless data service through an Internet Protocol (IP), an all-IP network, which is an IP network structure that integrates different networks based on IP, or the like, and may be configured as a combination of one or more of a wired network, a Wireless Broadband (WiBro) network, a 3G mobile communication network including WCDMA, a 3.5G mobile communication network including a High-Speed Downlink Packet Access (HSDPA) network and an LTE network, a 4G mobile communication network including LTE advanced, a satellite communication network, and a Wi-Fi network.

Also, the network may be any one of a wired/wireless local area communication network for providing communication between various kinds of data devices in a limited area, a mobile communication network for providing communication between mobile devices or between a mobile device and the outside thereof, a satellite communication network for providing communication between earth stations using a satellite, and a wired/wireless communication network, or may be a combination of two or more selected therefrom. Meanwhile, the transmission protocol standard for the network is not limited to existing transmission protocol standards, but may include all transmission protocol standards to be developed in the future.

The processor 1020 acquires media image creation information from a user.

Here, the media image creation information may include user information, a media image validity period, and media image encryption information.

Also, the processor 1020 creates a certificate for VPN access based on the media image creation information, and creates a media image using the media image creation information and the certificate for VPN access.

Here, the certificate for VPN access may be created based on the user information and the media image validity period.

Here, the media image may be a disk image file encrypted using the media image encryption information.

Here, the media image may be configured with OS core component files and OS filesystem files.

Here, the OS core component files may include a boot loader, a kernel, a kernel module, and a RAM disk for initial booting, and the OS filesystem files may include service and security software, a VPN certificate, VPN software, business software, and settings information related to various functions and security.

Also, the processor 1020 provides the media image to the user such that the user is able to create a medium for remote work.

Here, the medium for remote work may be in a form in which an encrypted disk image file corresponding to the media image is stored in a storage medium readable by a user terminal for remote work.

Here, a plaintext media image, in which OS software, security software, VPN software, and business software are included, may be created.

Here, a package binary may be created by building source code stored in an OS and security package repository and source code stored in a VPN and business package repository.

Here, a plaintext media image may be created by combining the created package binary with package binaries stored in the respective package repositories.

Here, the plaintext media image is encrypted using the media image encryption information, whereby an encrypted media image may be created.

Here, encryption is performed using an encryption key or a password included in the media image encryption information, in which case an OS boot loader for decryption may be included in the encrypted media image such that decryption can be performed in the user terminal for remote work.

Here, the user terminal for remote work is booted through the medium for remote work, which is created so as to correspond to the media image, thereby configuring a runtime environment for remote work in which security is ensured.

Here, the user terminal for remote work may decrypt the encrypted media image and verify the integrity thereof using media image decryption information acquired from the user based on execution of the OS boot loader for decryption.

Here, the user terminal for remote work may configure a runtime environment for remote work in which security is ensured by executing the OS software and the security software, may access a VPN by executing the VPN software, and may access a work system by executing the business software.

Also, when creation of a new media image is requested from a user in the state in which a media image is created, the processor 1020 discards the media image and the certificate for VPN access.

The memory 1030 stores the media image creation information and the media image.

Also, the memory 1030 stores various kinds of information generated in the above-described apparatus for establishing a remote work environment according to an embodiment of the present invention.

According to an embodiment, the memory 1030 may be separate from the apparatus for establishing a remote work environment, and may support the function for establishing a remote work environment. Here, the memory 1030 may operate as separate mass storage, and may include a control function for performing operations.

Meanwhile, the apparatus for establishing a remote work environment includes memory installed therein, whereby information may be stored therein. In an embodiment, the memory is a computer-readable medium. In an embodiment, the memory may be a volatile memory unit, and in another embodiment, the memory may be a nonvolatile memory unit. In an embodiment, the storage device is a computer-readable recording medium. In different embodiments, the storage device may include, for example, a hard-disk device, an optical disk device, or any other kind of mass storage device.

Using the above-described apparatus for establishing a remote work environment, the security of a terminal for remote work is ensured in order to be capable of responding to a security threat in a remote work environment, and an apparatus for the same is provided, whereby a secure remote work environment may be established.

Also, encryption of a medium used for running a terminal for remote work, user authentication, and a boot sequence of a terminal through the encrypted medium, and a method for ensuring the security of a runtime environment in which remote work software is run after booting may be provided.

Also, a medium for remote work is securely protected, and the security of a boot sequence and runtime environment of a user terminal is ensured, whereby a user may be enabled to establish a secure work environment in the terminal and to perform remote work.

Also, leakage of important information, which can occur when a medium is lost or taken away, may be prevented.

Figure 11:
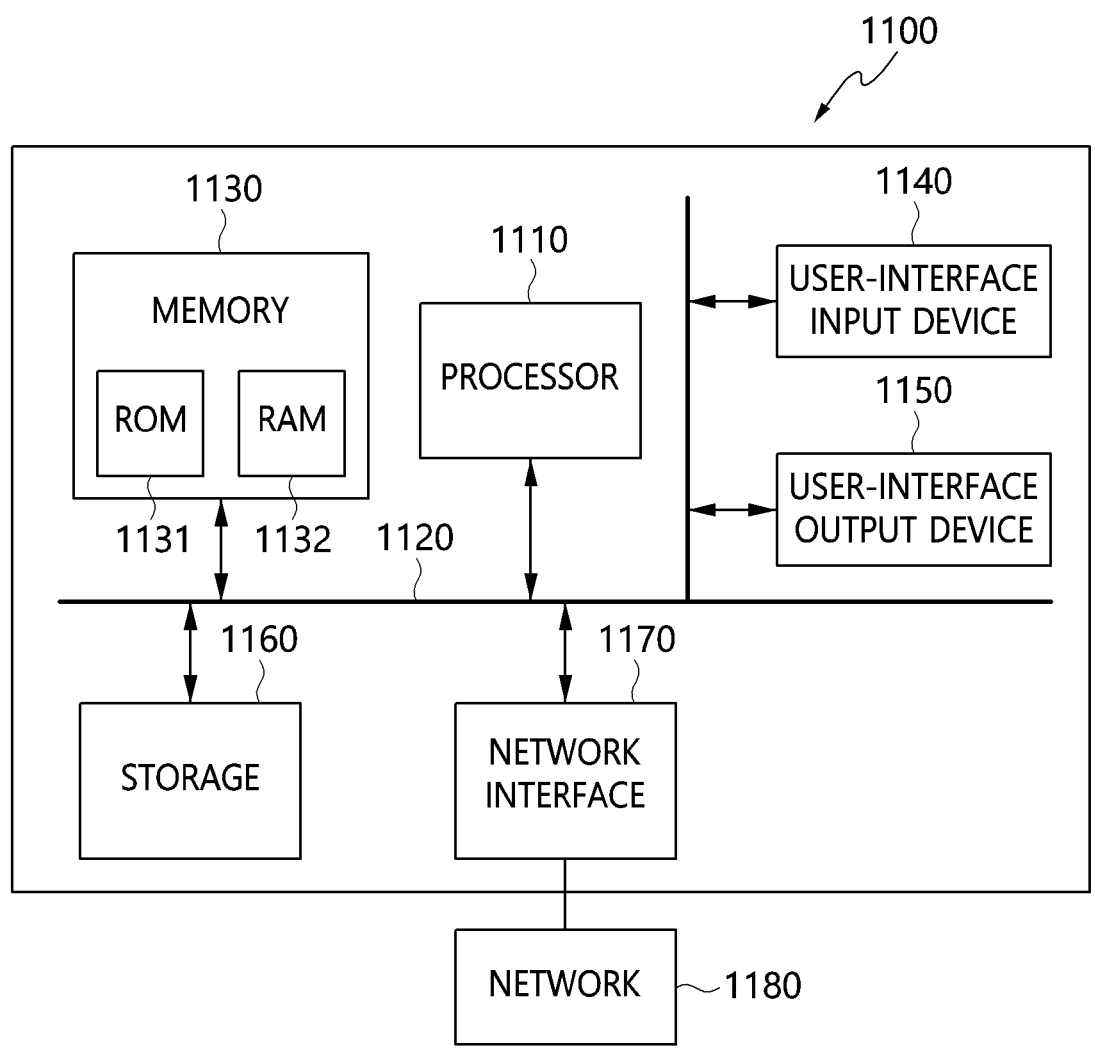
FIG. 11 is a view illustrating a computer system according to an embodiment of the present invention.

FIG. 11 is a view illustrating a computer system according to an embodiment of the present invention.

Referring to FIG. 11, an embodiment of the present invention may be implemented in a computer system including a computer-readable recording medium. As illustrated in FIG. 11, the computer system 1100 may include one or more processors 1110, memory 1130, a user-interface input device 1140, a user-interface output device 1150, and storage 1160, which communicate with each other via a bus 1120. Also, the computer system 1100 may further include a network interface 1170 connected to a network 1180. The processor 1110 may be a central processing unit or a semiconductor device for executing processing instructions stored in the memory 1130 or the storage 1160. The memory 1130 and the storage 1160 may be any of various types of volatile or nonvolatile storage media. For example, the memory may include ROM 1131 or RAM 1132.

Accordingly, an embodiment of the present invention may be implemented as a non-transitory computer-readable storage medium in which methods implemented using a computer or instructions executable in a computer are recorded. When the computer-readable instructions are executed by a processor, the computer-readable instructions may perform a method according to at least one aspect of the present invention.

According to the present invention, the security of a terminal for remote work is ensured in order to respond to a security threat in a remote work environment, and an apparatus therefor is provided, whereby a secure remote work environment may be established.

Also, the present invention encrypts important information in a medium that is used for running a terminal for remote work, thereby allowing access only by an authorized user.

Also, the present invention may boot a terminal after checking whether a user is an authorized user in a boot sequence, and may prevent the user from accessing the existing storage medium of the terminal after the terminal is booted.

Also, the present invention imposes limitations such that a terminal is allowed to access only a securely configured network, thereby protecting the terminal from malware.

Also, the present invention deletes, when remote work finishes, all temporary files generated during the remote work, thereby preventing information leakage.

Also, the present invention securely protects a medium for remote work and ensures the security of a boot sequence and runtime environment of a terminal, thereby enabling a user to establish a secure work environment in the terminal and to perform remote work.

As described above, the method for establishing a remote work environment for ensuring the security of a user terminal for remote work and the apparatus using the method according to the present invention are not limitedly applied to the configurations and operations of the above-described embodiments, but all or some of the embodiments may be selectively combined and configured, so that the embodiments may be modified in various ways.

What is claimed is:

1. A method for establishing a remote work environment, performed by an apparatus for establishing a remote work environment for ensuring security of a user terminal for remote work, the method comprising:
   acquiring media image creation information from a user;
   creating a certificate for Virtual Private Network (VPN) access based on the media image creation information and creating a media image using the media image creation information and the certificate for VPN access; and
   providing the media image to the user such that the user is able to create a medium for remote work,
   wherein the user terminal for remote work is booted through the medium for remote work, which is created so as to correspond to the media image, thereby configuring a runtime environment for remote work, in which security is ensured,
   wherein the creating of the media image comprises:
   creating a plaintext media image in which Operating System (OS) software, security software, VPN software, and business software are included; and
   creating an encrypted media image by encrypting the plaintext media image using the media image encryption information,
   wherein the creating of the plaintext media image comprises: creating a package binary by building source code stored in an OS and security package repository and source code stored in a VPN and business package repository, and combining the created package binary with package binaries stored in the OS and security package repository and the VPN and business package repository.

2. The method of claim 1, wherein the media image creation information includes user information, a media image validity period, and media image encryption information.

3. The method of claim 2, wherein the media image is a disk image file encrypted using the media image encryption information.

4. The method of claim 1, wherein the media image is configured with operating system (OS) core component files and OS filesystem files.

5. The method of claim 4, wherein:
   the OS core component files include a boot loader, a kernel, a kernel module, and a RAM disk for initial booting, and
   the OS filesystem files include service and security software, a VPN certificate, VPN software, business software, and settings information related to various functions and security, wherein the settings information related to security is used to perform a function of blocking the user and software from accessing an existing storage medium connected to the user terminal and from accessing an unauthorized network, thereby preventing a malware security threat.

6. The method of claim 3, wherein the medium for remote work is in a form in which the encrypted disk image file, corresponding to the media image, is stored in a storage medium readable by the user terminal for remote work.

7. The method of claim 1, wherein the creating of the encrypted media image is configured to perform encryption using an encryption key or a password included in the media image encryption information and to include an OS boot loader for decryption in the encrypted media image such that decryption is capable of being performed in the user terminal for remote work.

8. The method of claim 7, wherein the user terminal for remote work decrypts the encrypted media image and verifies integrity thereof using media image decryption information acquired from the user based on execution of the OS boot loader for decryption.

9. The method of claim 7, wherein the user terminal for remote work configures the runtime environment for remote work, in which the security is ensured, by executing the OS software and the security software, accesses a VPN by executing the VPN software, and accesses a work system by executing the business software.

10. The method of claim 2, wherein the certificate for VPN access is created based on the user information and the media image validity period.

11. The method of claim 1, further comprising:
    when a request to create a new media image is made by the user in a state in which the media image is created, discarding the media image and the certificate for VPN access.

12. An apparatus for establishing a remote work environment for ensuring security of a user terminal for remote work, comprising:
    a processor for acquiring media image creation information from a user, creating a certificate for Virtual Private Network (VPN) access based on the media image creation information, creating a media image using the media image creation information and the certificate for VPN access, creating a plaintext media image in which Operating System (OS) software, security software, VPN software, and business software are included, creating an encrypted media image by encrypting the plaintext media image using the media image encryption information, and providing the media image to the user such that the user is able to create a medium for remote work,
    wherein the creating of the plaintext media image comprises: creating a package binary by building source code stored in an OS and security package repository and source code stored in a VPN and business package repository, and combining the created package binary with package binaries stored in the OS and security package repository and the VPN and business package repository; and
    memory for storing the media image creation information and the media image,
    wherein the user terminal for remote work is booted through the medium for remote work, which is created so as to correspond to the media image, thereby configuring a runtime environment for remote work in which security is ensured.

13. The apparatus of claim 12, wherein the media image creation information includes user information, a media image validity period, and media image encryption information.

14. The apparatus of claim 13, wherein the media image is a disk image file encrypted using the media image encryption information.

15. The apparatus of claim 12, wherein the media image is configured with operating system (OS) core component files and OS filesystem files.

16. The apparatus of claim 15, wherein:
    the OS core component files include a boot loader, a kernel, a kernel module, and a RAM disk for initial booting, and
    the OS filesystem files include service and security software, a VPN certificate, VPN software, business software, and settings information related to various functions and security, wherein the setting information related to security is used to perform a function of blocking the user and software from accessing an existing storage medium connected to the user terminal and from accessing an unauthorized network, thereby preventing a malware security threat.

17. The apparatus of claim 14, wherein the medium for remote work is in a form in which the encrypted disk image file, corresponding to the media image, is stored in a storage medium readable by the user terminal for remote work.

18. A method for establishing a remote work environment, performed by an apparatus for establishing a remote work environment for ensuring security of a user terminal for remote work, the method comprising:

acquiring media image creation information from a user;

creating a certificate for Virtual Private Network (VPN) access based on the media image creation information and creating a media image using the media image creation information and the certificate for VPN access; and providing the media image to the user such that the user is able to create a medium for remote work, wherein the user terminal for remote work is booted through the medium for remote work, which is created so as to correspond to the media image, thereby configuring a runtime environment for remote work, in which security is ensured, wherein the media image is configured with operating system (OS) core component files and OS filesystem files, wherein the OS core component files include a boot loader, a kernel, a kernel module, and a RAM disk for initial booting, and wherein the OS filesystem files include service and security software, a VPN certificate, VPN software, business software, and settings information related to various functions and security, wherein the setting information related to security is used to perform a function of blocking the user and software from accessing an existing storage medium connected to the user terminal and from accessing an unauthorized network, thereby preventing a malware security threat.

* * * * *